(12) United States Patent
Apple

(10) Patent No.: US 10,814,768 B2
(45) Date of Patent: Oct. 27, 2020

(54) COMBINE HEADER TRANSPORT DEVICE

(71) Applicant: Scott D. Apple, Bowling Green, OH (US)

(72) Inventor: Scott D. Apple, Bowling Green, OH (US)

(*) Notice: Subject to any disclaimer, the term of this patent is extended or adjusted under 35 U.S.C. 154(b) by 51 days.

(21) Appl. No.: 16/259,255

(22) Filed: Jan. 28, 2019

(65) Prior Publication Data
US 2019/0232855 A1 Aug. 1, 2019

Related U.S. Application Data

(60) Provisional application No. 62/623,359, filed on Jan. 29, 2018.

(51) Int. Cl.
| | |
|---|---|
| *B60P 3/06* | (2006.01) |
| *B60P 1/02* | (2006.01) |
| *B60P 3/40* | (2006.01) |
| *A01D 75/00* | (2006.01) |

(52) U.S. Cl.
CPC ............ *B60P 3/066* (2013.01); *A01D 75/002* (2013.01); *B60P 1/027* (2013.01); *B60P 3/40* (2013.01)

(58) Field of Classification Search
CPC .. B60P 3/066; B60P 1/027; B60P 3/40; A01D 75/002; A01B 73/005
See application file for complete search history.

(56) References Cited

U.S. PATENT DOCUMENTS

| | | | |
|---|---|---|---|
| 3,400,949 A | 9/1968 | Kendall | |
| 4,523,771 A | 6/1985 | Bender | |
| 4,770,577 A | 9/1988 | Farris | |
| 5,040,825 A * | 8/1991 | Kuhns | A01D 75/002 280/144 |
| 5,374,082 A * | 12/1994 | Smith | A01D 75/002 280/124.111 |
| 5,785,472 A * | 7/1998 | Smith | B62D 63/061 410/156 |
| 5,887,880 A | 3/1999 | Mullican et al. | |
| 6,099,013 A | 8/2000 | Stoss | |
| 6,272,824 B1 * | 8/2001 | Smith | A01B 73/00 410/77 |
| 6,273,446 B1 | 8/2001 | Paul | |
| 6,428,047 B1 | 8/2002 | Kaderabek | |
| 6,575,488 B2 | 6/2003 | Massey | |

(Continued)

OTHER PUBLICATIONS

Van Valkenburgh et al, U.S. Statutory Invention Registration, Registration No. H1587 published Sep. 3, 1996.

*Primary Examiner* — Drew J Brown
(74) *Attorney, Agent, or Firm* — Marshall & Melhorn, LLC

(57) ABSTRACT

A combine header transport device includes a header support member. A frame is in mechanical communication with the header support member. The frame includes a first frame member and a second frame member. The frame members are in a parallel relationship with each other. A first pair of wheel assemblies are rotatably connected to a first axle assembly. The first axle assembly is attached to the frame adjacent a first end thereof. A connector assembly is attached to the frame adjacent a second end thereof. The connector assembly provides an axis about which the combine header transport device is rotatable. The connector assembly includes a first connector and is configured so that a position of the first connector is adjustable in a vertical direction.

20 Claims, 8 Drawing Sheets

(56) References Cited

U.S. PATENT DOCUMENTS

| | | | |
|---|---|---|---|
| 6,923,475 B1 | 8/2005 | Martin et al. | |
| 7,874,571 B2 | 1/2011 | Frey et al. | |
| 8,616,812 B2* | 12/2013 | Bergen | A01D 75/002 |
| | | | 280/789 |
| 8,714,594 B1 | 5/2014 | Hellbusch et al. | |
| 8,757,650 B2* | 6/2014 | Revelino | B60G 5/01 |
| | | | 280/124.169 |
| 9,415,647 B2 | 8/2016 | Woolf | |
| 10,457,324 B1* | 10/2019 | Hellbusch | B62D 7/142 |
| 2011/0155888 A1 | 6/2011 | Jordahl | |
| 2015/0342111 A1 | 12/2015 | Meenen et al. | |
| 2020/0120873 A1* | 4/2020 | Sudbrack | A01D 75/002 |

* cited by examiner

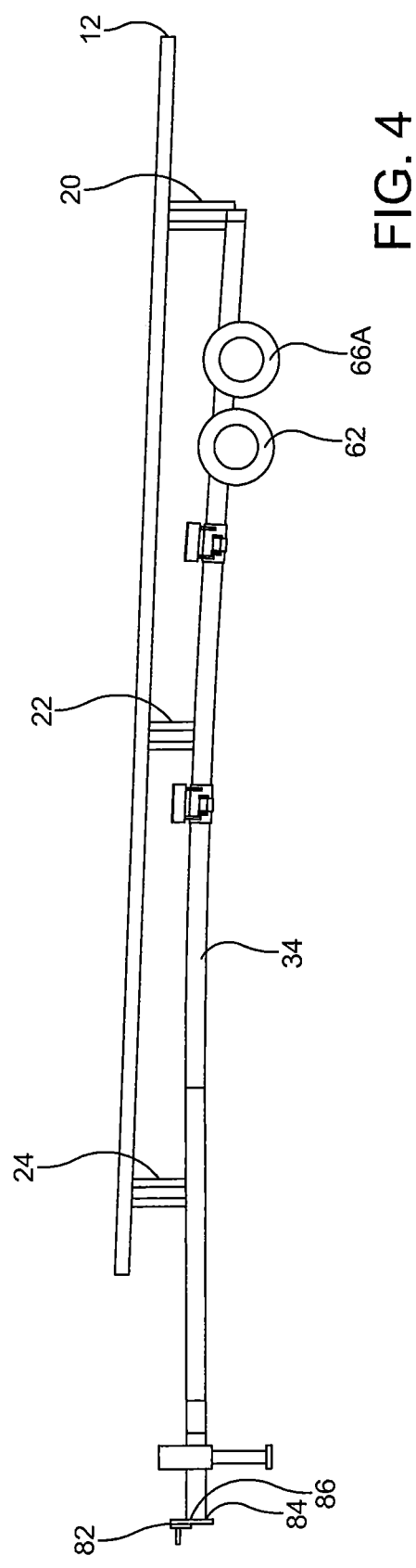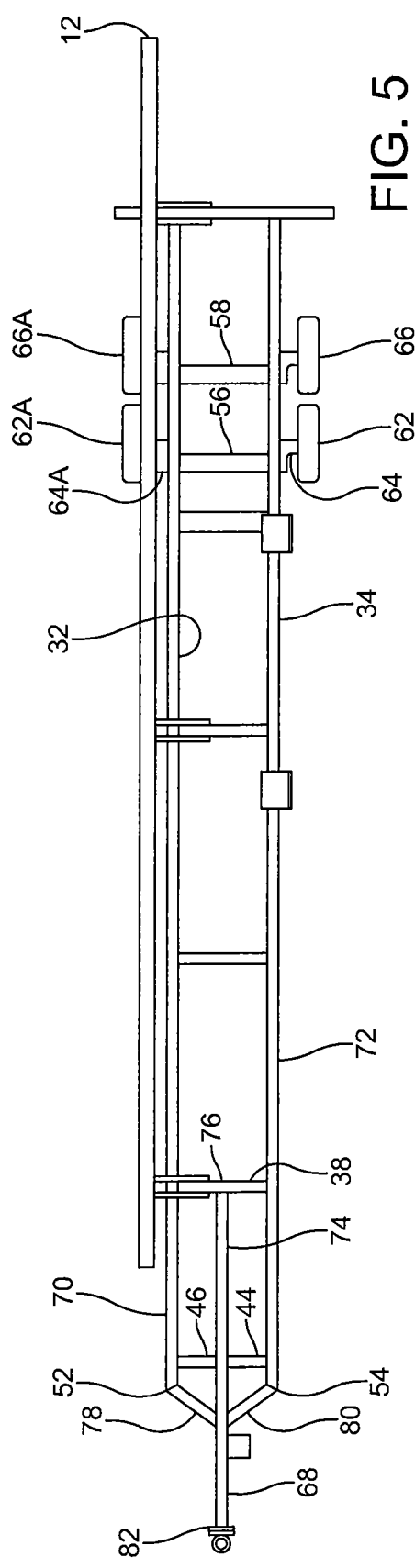

COMBINE HEADER TRANSPORT DEVICE

BACKGROUND

The invention relates to a combine header transport device.

Combine headers are a critical and expensive part of a combine. It is preferred to remove the header from the combine and transport each separately. A transport device such as, for example, a trailer can be utilized to transport a combine header from one location to another. However, the combine header trailers known in the art have limited and challenging maneuverability. Additionally, these trailers are not suitable for transporting a combine header at highway speeds and for long distances.

Thus, there is a need for an improved transport device that overcomes the above-described disadvantages.

SUMMARY

A combine header transport device comprising a header support member. A frame in mechanical communication with the header support member. The frame comprising a first frame member and a second frame member. The frame members being in a parallel relationship with each other. A first pair of wheel assemblies rotatably connected to a first axle assembly. The first axle assembly attached to the frame adjacent a first end thereof. A connector assembly attached to the frame adjacent a second end thereof. The connector assembly providing an axis about which the combine header transport device is rotatable. The connector assembly comprises a first connector and is configured so that a position of the first connector is adjustable in a vertical direction.

BRIEF DESCRIPTION OF THE SEVERAL VIEWS OF THE DRAWING

The above, as well as other advantages of the present invention will become readily apparent to those skilled in the art from the following detailed description when considered in the light of the accompanying drawings in which:

FIG. 4 is a side view of the combine header transport device of FIG. 2;

FIG. 5 is a top view of the combine header transport device of FIG. 2;

DETAILED DESCRIPTION

It is to be understood that the invention may assume various alternative orientations and step sequences, except where expressly specified to the contrary. It is also to be understood that the specific assemblies, devices, and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements found in the aforementioned embodiments may be referred to with like identifiers within this section of the application.

Figure 1:
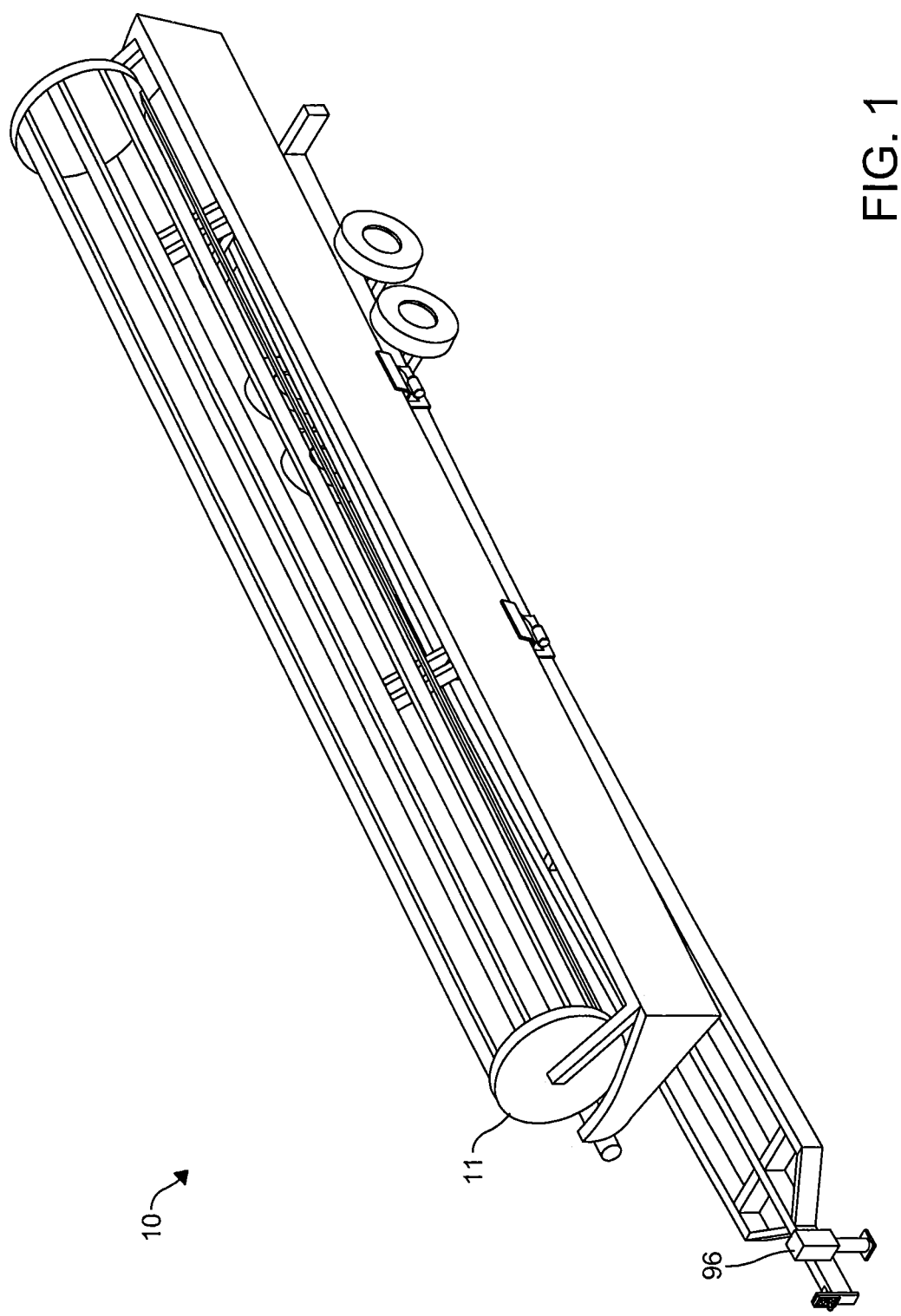
FIG. 1 is a front perspective view of an embodiment of the combine header transport device with a combine header provided thereon.

Embodiments of a combine header transport device 10 are described herein and are illustrated in FIGS. 1-10. The combine header transport device 10 may be utilized to transport a combine header 11, which is illustrated in FIG. 1, from one location to another and store the combine header 11 before and after it is transported.

Figure 2:
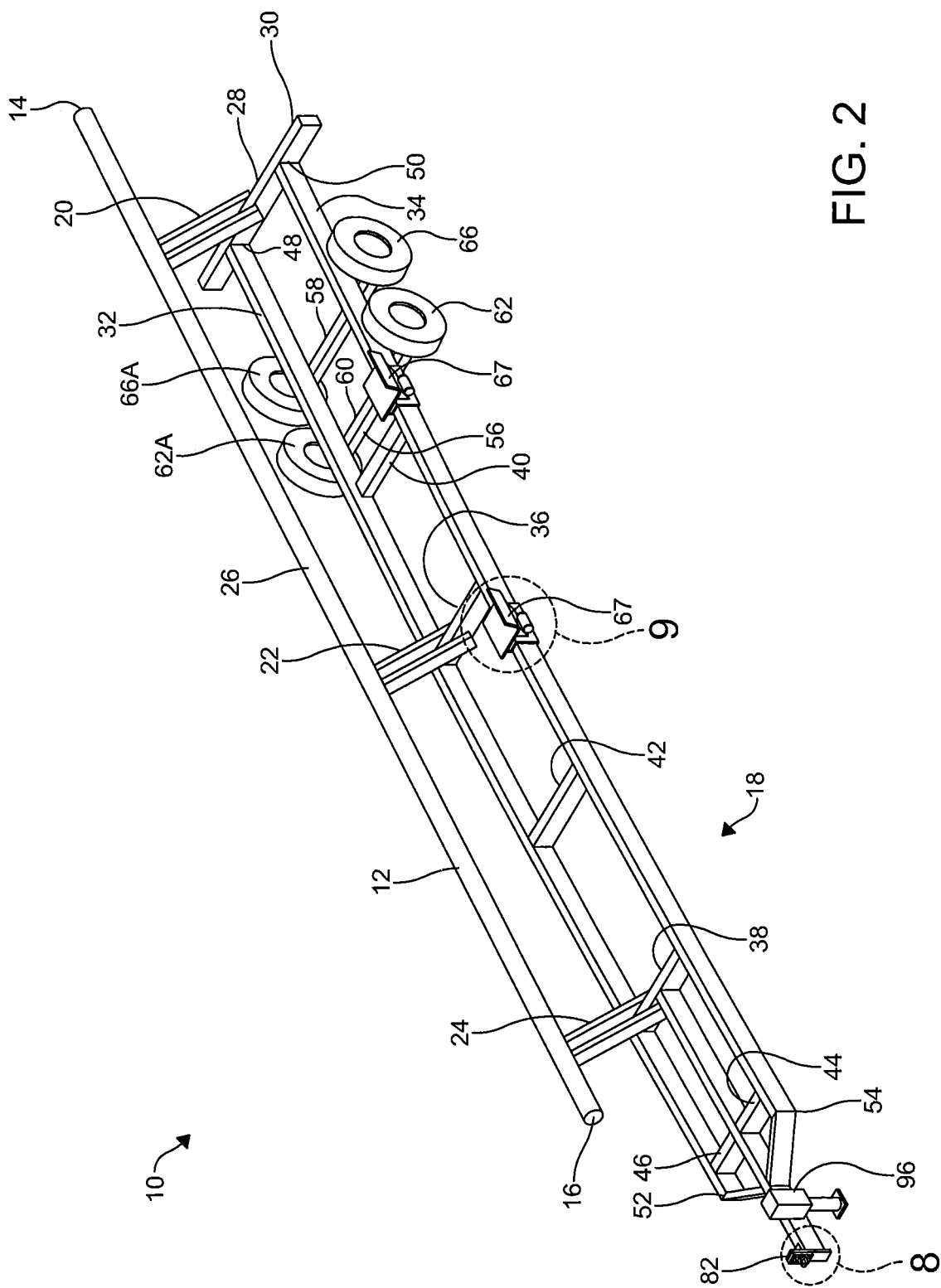
FIG. 2 is a front perspective view of an embodiment of the combine header transport device of FIG. 1 with the combine header removed.

Referring now to FIG. 2, the combine header transport device 10 comprises a header support member 12. Preferably, the header support member 12 provides support to the underside of the front end of the combine header when the header is received by the combine header transport device 10. Thus, it is preferred that the header support member 12 is formed from a rigid and durable materials such as, for example, steel.

The header support member 12 is an elongated member. The header support member 12 is of a length that is defined between first and second ends 14, 16 thereof. In an embodiment (not depicted), the length of the header support member 12 can be adjusted. Preferably, the length of the header support member 12 is selected to provide adequate support to the entire width of the combine header.

In some embodiments, the header support member 12 may be of a cylindrical shape. However, it should be appreciated that the header support member 12 can be of another shape. As illustrated in FIG. 2, when the combine header is not disposed on the combine header transport device 10, the header support member 12 is provided in a spaced apart relationship with a frame 18. Under these conditions, the header support member 12 is elevated with respect to the frame 18. Also, when the combine header 11 is disposed on the combine header transport device 10, the header support member 12 is elevated with respect to the frame 18.

Preferably, the frame 18 is constructed of rigid and durable materials such as, for example, steel. The frame 18 is in mechanical communication with the header support member 12 via a plurality of arms 20-24. The plurality of arms 20-24 are attached to the header support member 12. In the embodiments illustrated, a first arm 20 is attached to the header support member 12 adjacent the first end 14 thereof, a second arm 22 is attached to the header support member 12 adjacent a midpoint 26 of the header support member 12, and a third arm 24 is attached to the header support member 12 adjacent the second end 16 thereof. As illustrated, the length of the header support member 12 is such that the header support member 12 extends past the first arm 20 in a first direction and the third arm 24 in a second and opposite direction.

On an end, each arm 20-24 is attached to the header support member 12 via a weld or in another suitable manner. On an opposite end, each arm 20-24 is attached to a portion of the frame 18. In an embodiment, each arm 20-24 is attached to the frame 18 in a manner which allows the position of the header support member 12 to be adjusted relative to the frame 18. For example, each arm 20-24 may be attached to the frame 18 via a pivotal connection thereto.

Figure 3:
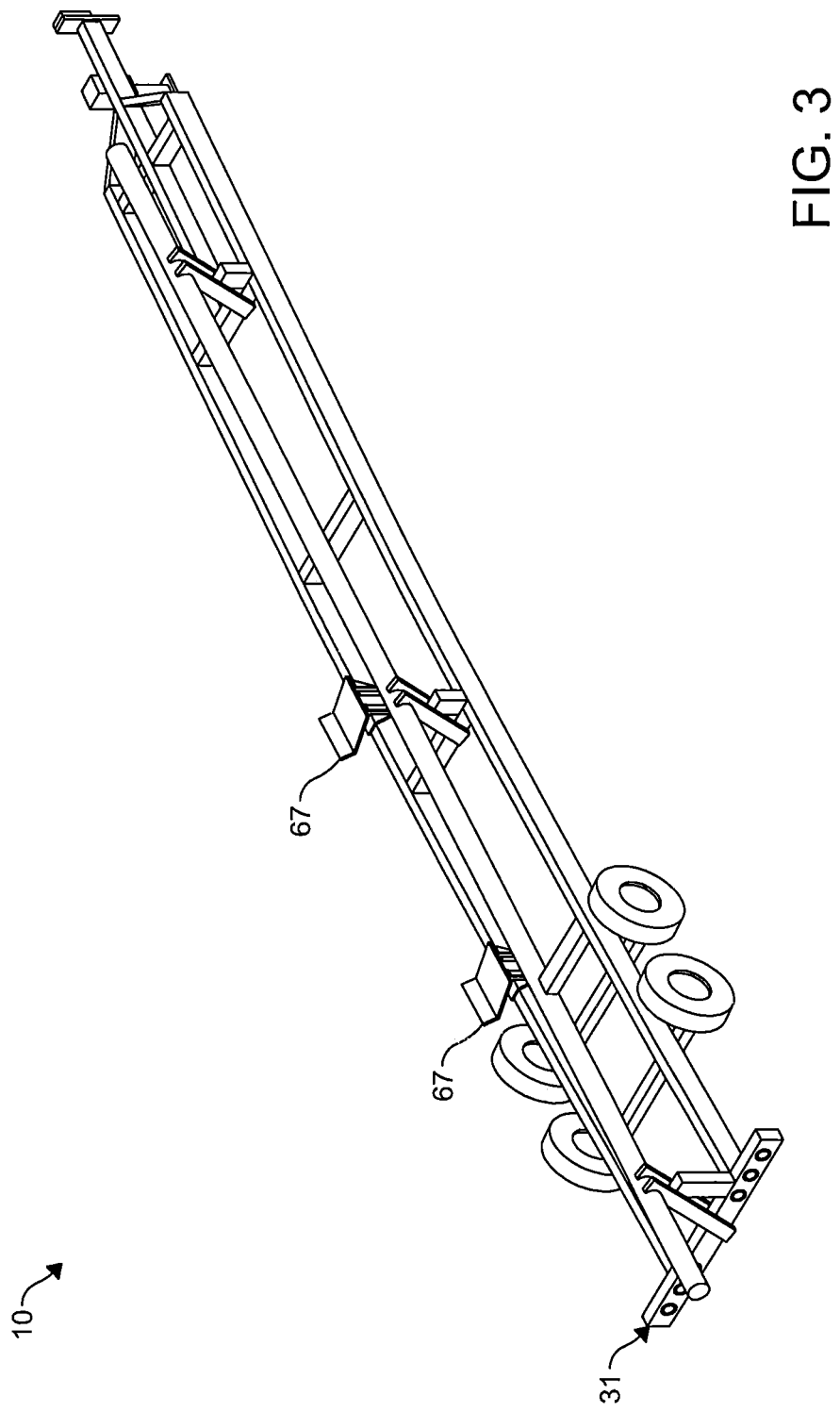
FIG. 3 is a rear perspective view of the combine header transport device of FIG. 2.

As illustrated, in an embodiment, the first arm 20 is attached to a first cross member 28. Preferably, the first cross member 28 is the rearmost cross member of the frame 18. In this embodiment, the first cross member 28 defines a rear end 30 of the frame 18. As is illustrated in FIG. 3, safety lighting 31 such as, for example, brake, tail, turn signal, and/or strobe lights are preferably attached to the first cross member 28. In certain embodiments, the safety lighting may be provided in a recessed portion of the first cross member 28. Preferably, the first cross member 28 is attached to and provided in a perpendicular relationship with a first frame member 32 and a second frame member 34.

Preferably, the second arm 22 is attached to a second cross member 36 and the third arm 24 is attached to a third cross member 38. The second cross member 36 is in a spaced apart and parallel relationship with the first cross member 28 and is attached to and provided in a perpendicular relationship with the first frame member 32 and the second frame member 34. One or more additional cross members 40 may be provided between the first cross member 28 and the second cross member 36. The third cross member 38 is in a spaced apart and parallel relationship with the second cross member 36 and is attached to and provided in a perpendicular relationship with the first frame member 32 and the second frame member 34. One or more additional cross members 42 may be provided between the second cross member 36 and the third cross member 38.

The header support member 12 is provided in a generally parallel relationship with the first frame member 32 and the second frame member 34. In an embodiment, the first frame member 32 and the second frame member 34 are in a parallel relationship with each other. Preferably, the first frame member 32 and the second frame member 34 are spaced apart from each other. In this embodiment, the first frame member 32 and the second frame member 34 are separated from each other by one or more cross members 28, 36, 38, 40-46. The first cross member 28 is attached to a first end 48 of the first frame member 32 and a first end 50 of the second frame member 34. From the first end 48, the first frame member 32 extends toward a front end 84 of the frame 18 and past the second end 16 of the header support member 12 to a second end 52 thereof. Similarly, from its first end 50, the second frame member 34 extends toward the front end 84 of the frame 18 and past the second end 16 of the header support member 12 to a second end 54 thereof.

The combine header transport device 10 comprises one or more axle assemblies 56, 58. However, due to the embodiments of the combine header transport device 10 described herein, the combine header transport device 10 eliminates the need for a front axle assembly, i.e. an axle assembly attached to the frame 18 adjacent the front end 84 thereof. Eliminating the need for a front axle assembly is advantageous because it decreases the cost and complexity of manufacturing the combine header transport device 10 and improves the maneuverability of the device 10 when compared with known devices.

Figure 11:
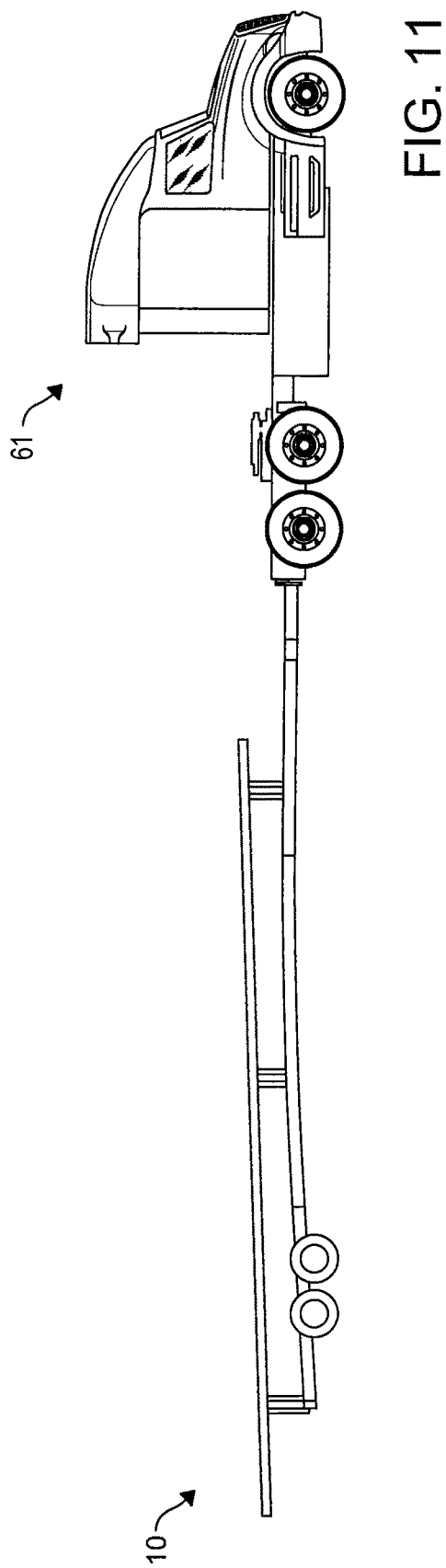
FIG. 11 is a side view of the combine header transport device of FIG. 2 attached to a tow vehicle.

For the axle assemblies 56, 58 provided, it is preferred that each axle assembly 56, 58 is attached to the frame 18 at a location which is adjacent the rear end 30 thereof. More particularly, it is preferred that each axle assembly 56, 58 is positioned in an axial direction between the midpoint 26 of the header support member 12 and the rear end 30 of the frame 18. Positioning each axle assembly 56, 58 adjacent the rear end 30 of the frame 18 provides certain advantages not found in the known devices. For example, positioning each axle assembly 56, 58 adjacent the rear end 30 of the frame 18 allows some of weight of the combine header transport device 10 to be transferred to a tow vehicle 61, which is illustrated in FIG. 11, which aids in maneuvering the combine header transport device 10 and extends the useful life of the device 10. Additionally, positioning each axle assembly 56, 58 as described above prevents one or more wheel assemblies 62, 62A, 66, 66A from interfering with and damaging the combine (not depicted) when the combine deposits the combine header on the combine header transport device 10.

In an embodiment, the combine header transport device 10 comprises a first axle assembly 56. In this embodiment, the first axle assembly 56 is attached to the first frame, member 32 adjacent a first end 48 of the first frame member 32 and the second frame member 34 adjacent a first end 50 of the second frame member 34. In another embodiment, the first axle assembly 56 is attached to both frame members 32, 34 such that the axle assembly 56 is positioned between the first cross member 28 and the second cross member 36. In another embodiment, comprises a second axle assembly 58. The second axle assembly 58 is provided in a spaced apart relationship with the first axle assembly 56. Preferably, the second axle assembly 58 is positioned between the first axle assembly 56 and the rear end 30 of the frame 18. In an embodiment, the combine header transport device 10 comprises one or more axle assemblies 56, 58 which consist of the first axle assembly 56 and the second axle assembly 58. As it is preferred that the first axle assembly 56 and the second axle assembly 58 are similarly configured, only the first axle assembly 56 will be described below.

Figure 6:
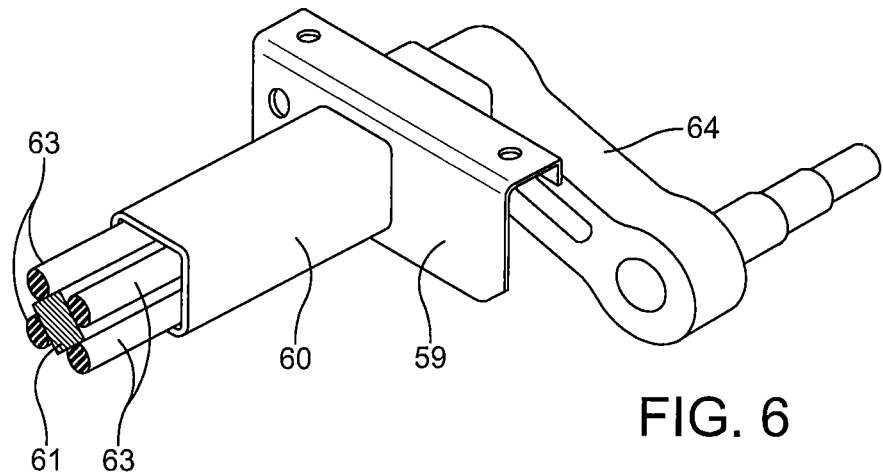
FIG. 6 is a partially sectional perspective view of a portion of an embodiment of an axle assembly suitable for use with the combine header transport device of FIG. 2.

Referring now to the embodiment illustrated in FIG. 6, the first axle assembly 56 may be attached to the first frame member 32 and the second frame member 34 via separate brackets. An example of a suitable bracket 59 for attaching the first axle assembly 56 to the first frame member 32 or the second frame member 34 is illustrated in FIG. 6. The first axle assembly 56 comprises a rotatable member 61 disposed and supported in an axle housing 60. Preferably, the rotatable member 61 is separated from the axle housing 60 by one or more elastomeric chords 63. The elastomeric chords 63 are disposed entirely within the axle housing 60 and surround the rotatable member 61. The rotatable member 61 is in mechanical communication with each wheel assembly 62, 62A of the pair of wheel assemblies. The rotatable member is in mechanical communication with each wheel assembly 62, 62A via separate arms 64, 64A. As illustrated best in FIG. 5, each arm 64, 64A defines an end of the axle assembly 56. In an embodiment, the first axle assembly 56 is Torflex® axle sold by Dexter Axle.

As illustrated, a pair of wheel assemblies are rotatably connected to each axle assembly 56, 58. Each wheel assembly 62, 62A, 66, 66A of the pair of wheel assemblies is in mechanical communication with the other wheel assembly 62, 62A, 66, 66A via the axle assembly 56, 58. Preferably, each wheel assembly 62, 62A, 66, 66A is connected to a particular axle assembly in such a manner that it is independently suspended from the other wheel assemblies 62, 62A, 66, 66A connected to that axle assembly 56, 58. Thus, for example, a first wheel assembly 62 of the pair of wheel assemblies can move vertically without causing a second wheel assembly 62A of the pair of wheel assemblies to move vertically. In certain embodiments, each wheel assembly includes a brake device (not depicted). Preferably, the brake device is of the electrical variety.

In some embodiments, one or more combine header cradles 67 are attached to the frame. The one or more combine header cradles 67 are provided to support the back end of the combine header when the header is disposed on the combine header transport device 10. Each combine header cradle 67 receives a portion of the back end of the combine header 11. More particularly, each combine header cradle 67 includes a combine header receiving portion 98 and each combine header receiving portion 98 receives a separate frame portion of the back end of the combine header 11. Preferably, as is illustrated in, for example, FIG. 2, a pair of combine header cradles 67 are provided and each combine header cradle 67 is secured to the second frame member 34. Each combine header cradle 67 is adjustable. For example, when the combine header transport device is not in use, the position of each combine header cradle 67 can be adjusted relative to the second frame member 34 by loosening the ratchet strap as necessary and moving the desired combine header cradle 67 in a horizontal direction as necessary.

Figure 9:
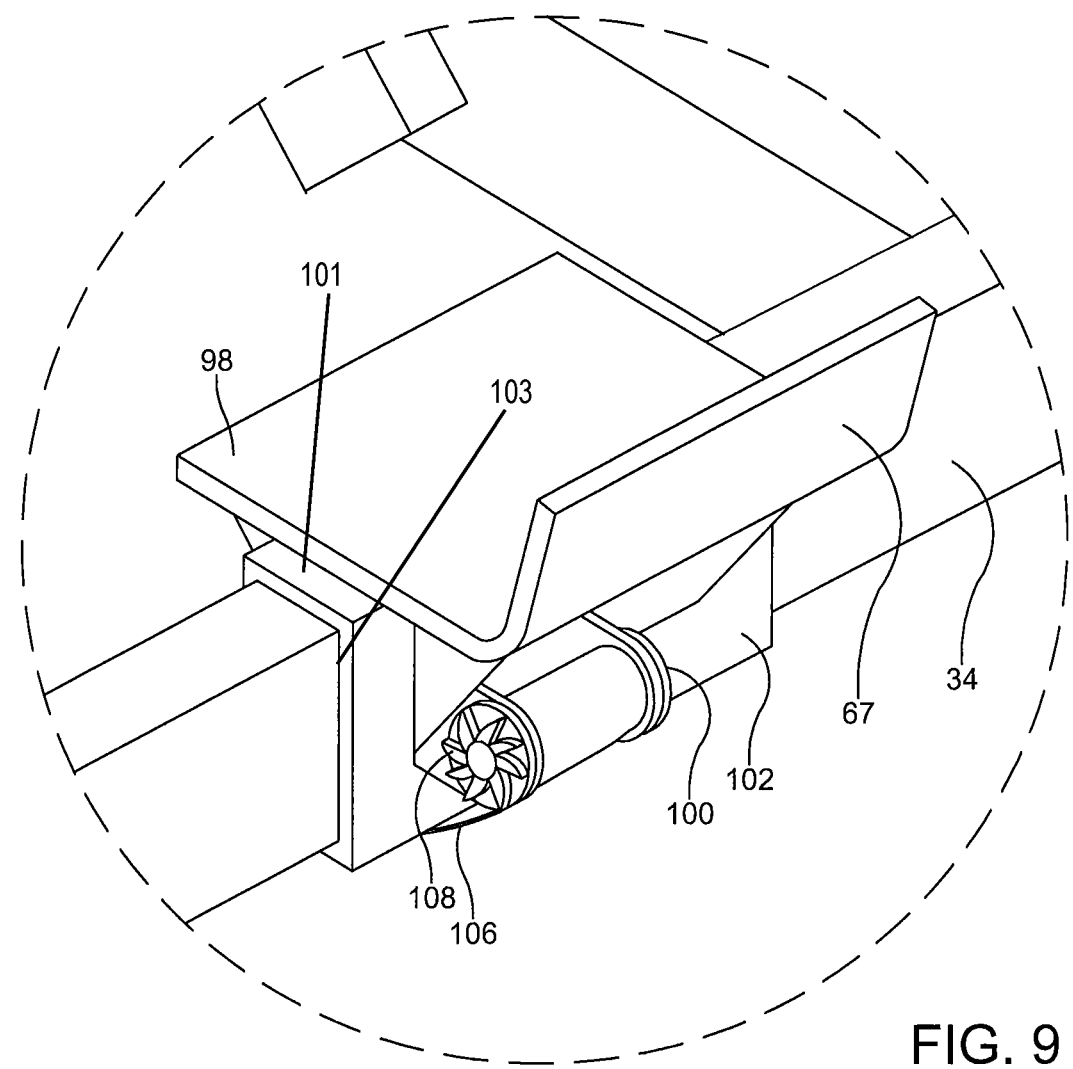
FIG. 9 is an enlarged view of a portion of the combine header transport device of FIG. 2.
Figure 10:
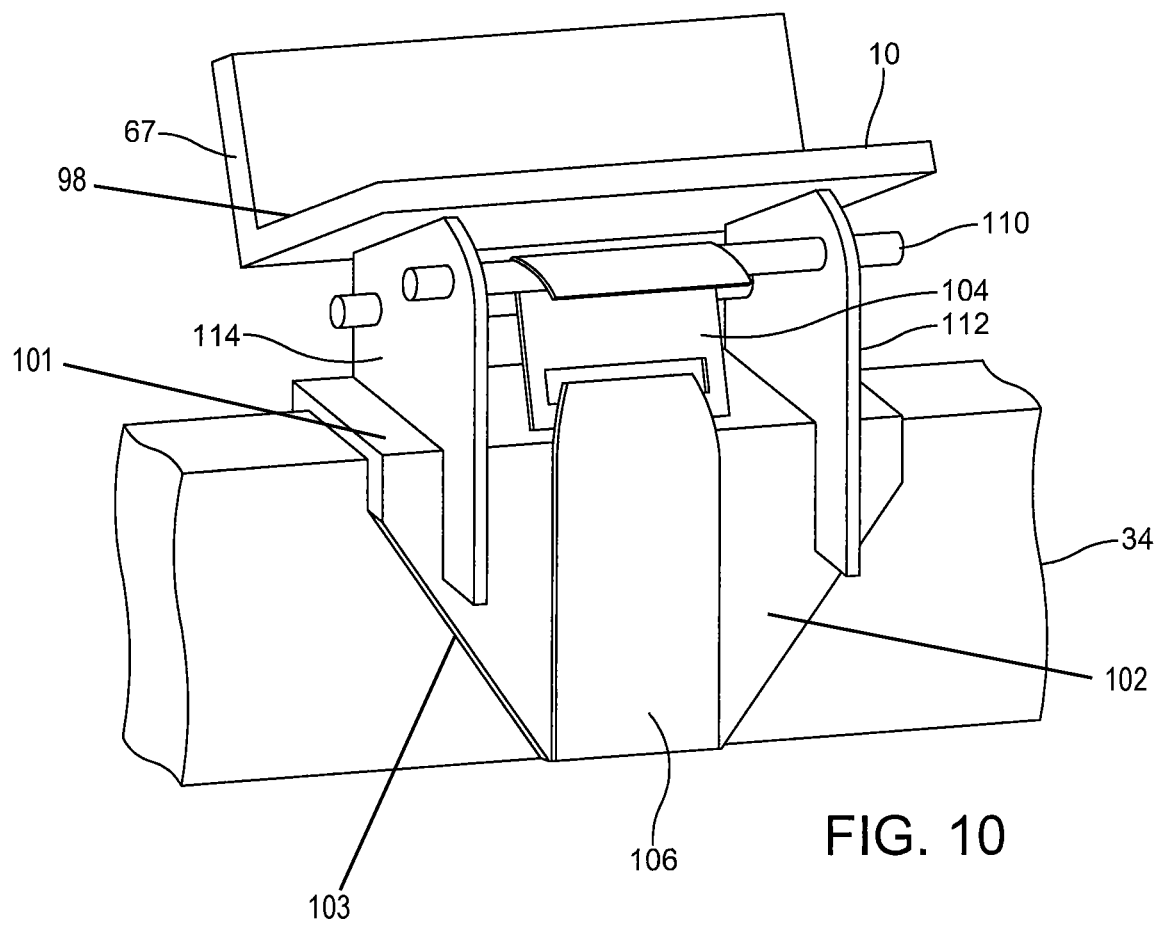
FIG. 10 is an inner perspective view of a portion of the combine header transport device.

In certain embodiments, each combine header cradle 67 comprises a ratchet strap assembly 100, which is illustrated in FIGS. 9-10. As best seen in FIGS. 9 and 10 of the disclosure and as a non-limiting example, the one or more sidewalls 102 may extend outward from a body portion 101 of the one or more combine header cradles defining a frame receiving portion 103 therein. The frame receiving portion 103 of the one or more combine header cradles 67 may be of a size and shape to receive and/or retain at least a portion of the second frame member 34 of the frame 18 of the combine header transport device 10. At least a portion of the ratchet strap assembly 100 may be attached to at least a portion of one of the one or more sidewalls 102 of the combine header cradle 67. The ratchet strap assembly 100 comprises a hook 104, ratchet strap 106, and ratchet mechanism 108. In one such embodiment, the hook 104 is connected to an end of the ratchet strap 106. When in use, the hook 104 may engage a pin 110 that is positioned beneath the combine header receiving portion 98. The pin 110 may extend through a pair of cradle arms 112, 114, which support the pin 110 and the combine header receiving portion 98. An opposite end of the ratchet strap 106 is connected to the ratchet mechanism 108. As illustrated in FIG. 9, the ratchet strap 106 extends from ratchet mechanism 108 and a first side of the second frame member 34 to a second side of the second frame member 34, which is illustrated in FIG. 10. The ratchet strap assembly 100 is utilized to secure the combine header cradle 67 to the second frame member 34.

Referring back to FIG. 5, in certain embodiments, the frame 18 comprises a third frame member 68. The third frame member 68 may be a discrete portion of the frame 18. Alternatively, the first frame member 32 or the second frame member 34 may be configured such that the third frame member 68 is formed in a unitary manner with the first frame member 32 or the second frame member 34. In other embodiments (not depicted), the third frame member 68 may not be provided. In these embodiments, the first frame member 32 and the second frame member 34 may be extended and connected to each other to define the front end of the 84 of the frame 18.

In embodiments where the third frame member 68 is provided, the third frame member 68 is a rigid member. Preferably, the third frame member 68 does not rotate independent of the combine header transport device 10 or include any portions rotate independent of the combine header transport device 10. The third frame member 68 can be of any suitable length.

In some embodiments, the third frame member 68 is spaced apart from the first frame member 32 and the second frame member 34. In one such embodiment, the third frame member 68 is provided in a parallel relationship with a portion 70 of the first frame member 32 and a portion 72 of the second frame member 34. More particularly, in an embodiment, a first portion 74 of the third frame member 68 is in a spaced apart and parallel relationship with an end portion 70 of the first frame member 32 and an end portion 72 of the second frame member 34.

In an embodiment, a first end 76 of the third frame member 68 is attached to the third cross member 38. Thus, in this embodiment, the third frame member 68 is in mechanical communication with the first frame member 32 and the second frame member 34 via the third cross member 38. From the first end 76, the third frame member 68 may extend to and past a pair of cross members. Preferably, each cross member 44, 46 of the pair of cross members is attached to the third frame member 68 and one of the first frame member 32 and the second frame member 34. Therefore, when provided, the pair of cross members enable mechanical communication between the third frame member 68 and the first frame member 32 and the second frame member 34.

Additional cross members may permit further mechanical communication between the third frame member and the first frame member or the second frame member. For example, a first end cross member 78 may be attached to the second end 52 of the first frame member 32 and a side of the third frame member 68. Additionally, a second end cross member 80 may be attached to the second end 54 of the second frame member 34 and another side of the third frame member 68. However, in some embodiments (not depicted), the first end cross member may be formed in a unitary manner with the first frame member and the second end cross member may be formed in a unitary manner with the second frame member.

As illustrated, the first end cross member 78 may be provided in an oblique relationship with the first frame member 32 and the third frame member 68. Additionally, the second end cross member 80 may be provided in an oblique relationship with the second frame member 34 and the third frame member 68. In other embodiments, the first end cross member 78 and the second end cross member 80 may be oriented in another manner. For example, in some embodiments (not depicted), one or both of the first end cross member 78 and the second end cross member 80 may be oriented in a perpendicular relationship with one or more of the first frame member 32, second frame member 34, and third frame member 68.

In an embodiment, the third frame member 68 extends beyond the second end 52 of the first frame member 32 and the second end 54 of the second frame member 34 to a second end thereof 86. The second end 86 of the third frame member 68 may define the front end 84 of the frame 18. A connector assembly 82 is attached to the frame 18 adjacent the front end 84 thereof. In an embodiment, the connector assembly 82 is attached to the second end 86 of the third frame member 68. In other embodiments (not depicted), the connector assembly 82 is attached to the frame 18 adjacent the front end 84 thereof and the front end 84 of the frame 18 is at or near an intersection of the first frame member 32 and the second frame member 34.

Figure 7:
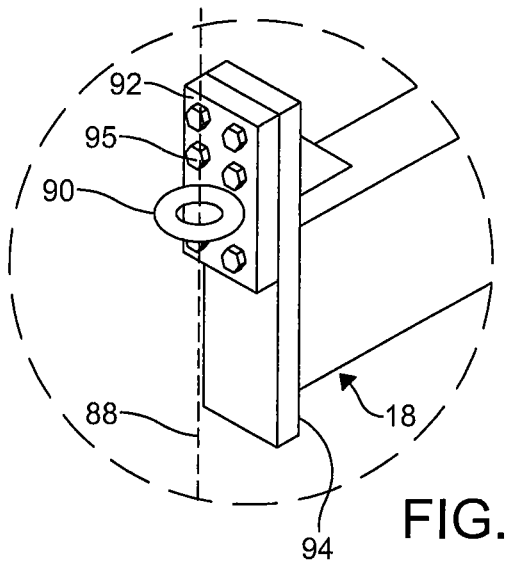
FIG. 7 is an enlarged view of a portion of the combine header transport device of FIG. 2.
Figure 8:
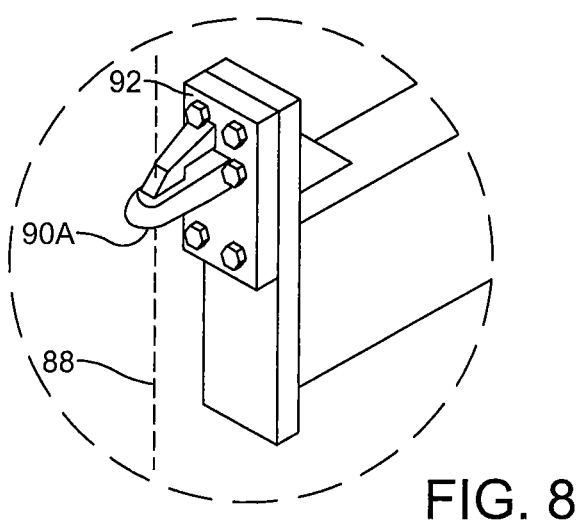
FIG. 8 is a perspective view of a portion of another embodiment of the combine header transport device.

The connector assembly 82 is provided to enable mechanical communication between the combine header transport device 10 and the tow vehicle 61. Referring now to FIGS. 7-8, utilizing the connector assembly 82 described herein enables the combine header transport device 10 to operate with only one axis 88 about which the device 10 is rotatable. Providing only one axis 88 about which the combine header transport device 10 is rotatable allows the combine header transport device 10 to be maneuvered more easily and placed into a desired position relative to the combine more quickly than known devices. Furthermore, providing only the one axis 88 about which the combine header transport device 10 is rotatable decreases the likelihood that the device 10 will jack-knife and the driver of the tow vehicle 61 will lose control of the device 10. Additionally, the connector assembly 82 enables the combine header transport device 10 to be in directly coupled to the tow vehicle 61, which increases the safety of transporting the combine header at highway speeds and when braking.

The connector assembly 82 comprises a first connector 90, 90A which is provided on the combine header transport device 10 and a second connector which is provided on the tow vehicle 61. In order to enable mechanical communication between the combine header transport device 10 and the tow vehicle 61, the first connector 90, 90A may receive the second connector or vice versa. In an embodiment, the connector assembly 90 may be of the pintle variety. In this embodiment and as is illustrated in FIG. 7, the first connector 90 may be, for example, a ring member and the second connector may comprise a hook. In another embodiment, like the one illustrated in FIG. 8, the first connector 90A may comprise a ball receiving member. In this embodiment, the second connector (not depicted) may comprise a ball and ball mount. When the first connector 90, 90A receives the second connector or vice versa the combine header transport device 10 is rotatable about the axis 88.

Preferably, the connector assembly 90, 90A is configured so that the position of the first connector 90, 90A is adjustable in a vertical direction. More preferably, the first connector 90, 90A is adjustable in a vertical direction relative to the front end 84 of the frame 18. Adjustment of the first connector 90, 90A in a vertical direction allows the first connector 90, 90A to receive the second connector or vice versa and position the device 10 in a generally horizontal orientation regardless of the height that the second connector is provided at on the tow vehicle 61, which enables the combine header transport device 10 to be utilized with a wider variety of tow vehicles than the prior art devices.

In one embodiment, the connector assembly comprises a support member 92 and a flange member 94. In this embodiment, it is preferred that the first connector 90, 90A is permanently secured to the support member 92 and the flange member 94 is permanently secured to the front end 84 of the frame 18. When the combine header transport device 10 is being used to move a combine header, the support member 92 is secured to the flange member 94. The support member 92 can be secured to the flange member 94 via conventional methods such as, for example, fasteners or by another method. In an embodiment like the one illustrated in FIG. 7, the support member 92 may comprises a plurality of openings which correspond to a plurality of openings formed in the flange member 94. To secure the support member 92 to the flange member 94, one or more fasteners 95 can be placed into corresponding openings in the support member 92 and corresponding openings in the flange member 94. To adjust the position of the first connector 90, 90A, one or more fasteners 95 can be removed from the openings and the support member 92 can be moved in relation to the flange member 94. When the first connector 90, 90A is in a desired position, the fasteners can be placed into the appropriate openings in the support member 92 and the corresponding openings in the flange member 94.

When a combine header 10 is being transported, the combine header transport device 10 is connected to the tow vehicle 61 as described above. Also, as noted above, the combine header transport device 10 may be utilized to store the combine header. For example, the combine header may remain on the combine header transport device 10 after being transported to a desired location and until it is desired to attach the header to a combine. The combine header can be stored on the combine header transport device 10 when the device is attached to the tow vehicle 61 and when the combine header transport device 10 is not attached to the tow vehicle 61.

When the combine header transport device 10 is not connected to a tow vehicle, a support stand assembly 96 may be utilized to keep the combine header transport device 10 in a generally horizontal and stable position relative to the terrain that it is disposed over. Preferably, the support stand assembly 96 is attached to the combine header transport device 10. More preferably, the support stand assembly 96 is attached to a portion of the frame 18 near the front end 84 thereof. In one such embodiment, the support stand assembly 96 is attached to the third frame member 68 adjacent the connector assembly 90, 90A. In another embodiment, the support stand assembly 96 may be attached to the third frame member 68 at a location adjacent the location where the first end cross member 78 and the second end cross member 80 attach to the third frame member 68. In yet another embodiment, the support stand assembly 96 may be attached to the frame 18 at a location adjacent the intersection of the first frame member 32 and the second frame member 34.

The support stand assembly 96 has an adjustable length. When it is desired to disconnect the combine header transport device 10 from the tow vehicle 61, the length of the support stand assembly 96 may be increased. After the combine header transport device 10 is connected to the tow vehicle 61; the length of the support stand assembly 96 may be decreased. Adjusting the length of the support stand assembly 96 prevents the support stand assembly 96 from being damaged by the road when the combine header transport device 10 is in motion and allows the support stand assembly 96 to support the device 10 over a variety of ground conditions.

The combine header transport device 10 provides an efficient and safe one-step method of loading and unloading a combine header 11. For example, loading or unloading of a combine header 11 can typically be accomplished in less than two minutes and in a safe manner. It should be appreciated that loading and unloading efficiency and speed are important due to the limited number of days for timely harvest. Furthermore, because loading and unloading may occur on a roadway, the combine header transport device 10 increases safety and reduces the hazards of working on the roadway.

When loading the combine header 11, a combine (not depicted) is provided with the combine header 11 attached thereto. The combine approaches the combine header transport device 10. Preferably, the combine header transport device 10 is attached to the tow vehicle 61 when the combine header 11 is loaded thereon. In certain embodiments, the tow vehicle 61 and combine header transport device 10 are in a parallel relationship with each other during loading or unloading. In these embodiments, the tow vehicle 61 and combine header transport device 10 may remain parallel to a roadway during loading or unloading, which prevents working across roadways and traffic patterns.

During loading, the combine header 11 is directed to a location above the combine header transport device 10 and aligned with the combine holders 67 as the combine approaches the combine header transport device 10. Next, the combine header 11 is lowered onto the combine header transport device 10 and the combine header 11 is detached from the combine. Once detached, the combine header 11 rests on the combine header transport device 10. More particularly, the combine header 11 rests on the support member bar 12 and the combine header cradles 67. The combine header 11 may be further secured to the combine header transport device 10 using one or more straps, chains, or additional securing members. These additional securing members can be adjusted using a ratchet, binder, or another tensioning member to ensure that the combine header 11 does not shift relative to the combine header transport device 10 during transport. Preferably, two straps and corresponding ratchets are provided to secure the combine header 11 to the combine header transport device 10. In an embodiment, it is preferred that each strap is secured to the combine header 11 with a hook and the corresponding ratchet is secure to a combine header cradle 67.

An advantage of the method is that the combine header 11 is never placed on the ground and that the tow vehicle 61 does not need to be moved into position after the combine header 11 is detached from the combine. As should be appreciated, placing the combine header 11 on the ground is not preferred because the combine header 11 can be damaged and because, under some conditions, it may be difficult to find a space that can accommodate the width and the length of a combine header 11.

Similarly, utilizing the combine header transport device 10 is safe and efficient when unloading a combine header 11. After the tow vehicle 61 has been positioned in a desired location such as, for example, a roadway or the edge of a field, the securing straps can be released. An advantage of the method of unloading the combine, header transport device 10 is that the combine header 11 does not need to be rotated in order to remove header from the combine header transport device 10. Therefore, after releasing the securing straps, the combine header 11 can be removed from the combine header transport device 10 by driving the combine up to the combine header transport device 10 and lifting the combine header 11 off of the device 10, which attaches the combine header 11 to the combine. Accordingly, the combine header 11 is not placed on the ground during unloading and the tow vehicle 61 does not need to be repositioned before the combine header 11 is attached to the combine.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

The invention claimed is:

1. A combine header transport device, comprising:
   a header support member;
   a frame having a first end and a second end is in mechanical communication with the header support member, wherein the frame comprises a first frame member and a second frame member;
   a first pair of wheel assemblies rotatably connected to a first axle assembly, wherein the first axle assembly is attached to the frame;
   a connector assembly attached to the frame adjacent the second end thereof, wherein the connector assembly comprises a first connector and is configured so that a position of the first connector is adjustable in a vertical direction; and
   one or more combine header cradles, wherein at least a portion of the one or more combine header cradles are connected to at least a portion of the second frame member by using a ratchet mechanism in mechanical communication with a ratchet strap.

2. The combine header transport device of claim 1, wherein the first connector is a ring member or a ball receiving receiver; and/or
   wherein the first connector is adjustable in the vertical direction relative to the second end of the frame.

3. The combine header transport device of claim 1, further comprising a support stand assembly, wherein the support stand assembly has a height which is adjustable and attached to the frame adjacent the connector assembly.

4. The combine header transport device of claim 1, wherein the first axle assembly comprises a rotatable member disposed in an axle housing, and wherein the rotatable member is in mechanical communication with each wheel assembly of the of the first pair of wheel assemblies via separate arms; and/or
   wherein the first axle assembly comprises a suspension assembly housed entirely within an axle housing, and wherein the axle housing is attached to the first frame member and the second frame member.

5. The combine header transport device of claim 1, wherein the header support member comprises a midpoint interposed between a first end and a second end; and
   wherein the first axle assembly is positioned axially between the midpoint of the header support member and the first end of the frame.

6. The combine header transport device of claim 1, further comprising a first cross member attached to and provided in a perpendicular relationship with the first frame member and the second frame member;
   wherein the first axle assembly is positioned between the first cross member and a second cross member; and
   wherein the first cross member is attached to an end of the first frame member and an end of the second frame member and defining the first end of the frame.

7. The combine header transport device of claim 1, wherein the connector assembly further comprises a support member and a flange member;
   wherein the first connector being permanently secured to the support member;
   wherein the flange member being permanently secured to the second end of the frame; and
   wherein the support member is moveable in a vertical direction relative to the flange member.

8. The combine header transport device of claim 1, wherein the frame further comprises a third frame member;
   wherein the third frame member is non-rotatable relative to the first frame member and the second frame member; and
   wherein at least a portion of the third frame member extending beyond an end of the first frame member and an end of the second frame member.

9. The combine header transport device of claim 8, wherein the third frame member is formed in a unitary manner with the first frame member and/or the second frame member.

10. The combine header transport device of claim 8, wherein another portion of the third frame member comprises a first end of the third frame member;
wherein the first end of the third frame member attached to a cross member in mechanical communication with the header support member via an arm; and
wherein the first portion of the third frame member being in a spaced apart and in parallel relationship with an end portion of the first frame member and an end portion of the second frame member.

11. The combine header transport device of claim 1, wherein the header support member is elongated and has a length which is substantially equal to a length of a combine header secured to the combine header transport device; and/or
wherein the header support member is provided in a parallel relationship with the frame and extends beyond the first end of the frame.

12. The combine header transport device of claim 1, further comprising a second pair of wheel assemblies rotatably connected to a second axle assembly;
wherein the second axle assembly is provided in a spaced apart relationship with the first axle assembly and positioned between the first axle assembly and the first end of the frame; and
wherein a first wheel assembly of the second pair of wheel assemblies is suspended independently from a second wheel assembly of the second pair of wheel assemblies.

13. The combine header transport device of claim 1, wherein the frame is in mechanical communication with the header support member via a plurality of arms; and
wherein each arm of the plurality of arms is attached to the frame via a pivotal connection.

14. The combine header transport device of claim 1, wherein the one or more combine header cradles has a combine header receiving portion having a size and shape to received and/or retain at least a portion of the a combine header therein.

15. The combine header transport device of claim 1, wherein the one or more combine header cradles have one or more sidewalls extending from a body portion of the one or more combine header cradles defining a frame receiving portion; and
wherein the frame receiving portion is of a size and shape to receive and/or retain at least a portion of the second frame member therein.

16. The combine header transport device of claim 15, wherein one or more cradle arms extend outward from the body portion of the one or more combine header cradles;
wherein the one or more combine header cradles has a combine header receiving portion having a size and shape to received and/or retain at least a portion of the a combine header therein; and
wherein at least a portion of the combine header receiving portion is connected to at least a portion of an end portion of said one of more cradle arms opposite the body portion of the one or more combine header cradles.

17. The combine header transport device of claim 16, wherein at least a portion of the one or more cradle arms and at least a portion of the combine header receiving portion of the one or more combine header cradles are integrally formed as part of the one or more cradle arms of the one or more combine header cradles.

18. The combine header transport device of claim 1, wherein an end portion of the ratchet strap opposite the ratchet mechanism comprises a hook; and
wherein at least a portion of the hook of the ratchet mechanism is selectively securable to at least a portion of the one or more combine header cradles.

19. The combine header transport device of claim 1, wherein the one or more combine header cradles have a body portion with one or more cradle arms extending outward therefrom;
wherein the one or more combine header cradles have one or more sidewalls extending outward from the body portion of the one or more combine header cradles in a direction opposite the one or more cradle arms;
wherein at least a portion of one or more pins are connected to at least a portion of the one or more cradle arms of the one or more combine header cradles;
wherein an end portion of the ratchet strap opposite the ratchet mechanism comprises a hook; and
wherein at least a portion of the hook of the ratchet mechanism is selectively securable to at least a portion of the one or more pins of the one or more combine header cradles.

20. The combine harder transport device of claim 19, wherein at least a portion of the one or more pins are interposed between a combine header receiving portion of the one or more combine header cradles and the body portion of the one or more combine header cradles.

* * * * *